Oct. 10, 1961
C. C. BELL
3,003,687
TIME INTEGRATING SYSTEM
Filed Jan. 15, 1958
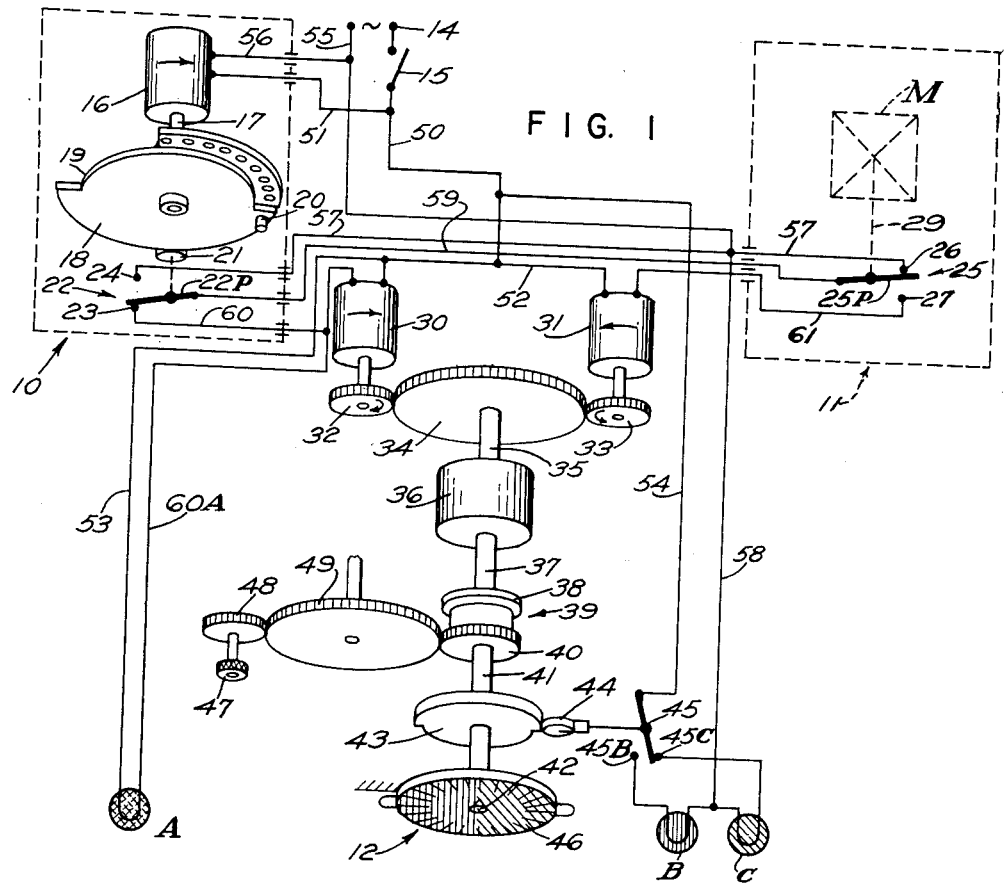
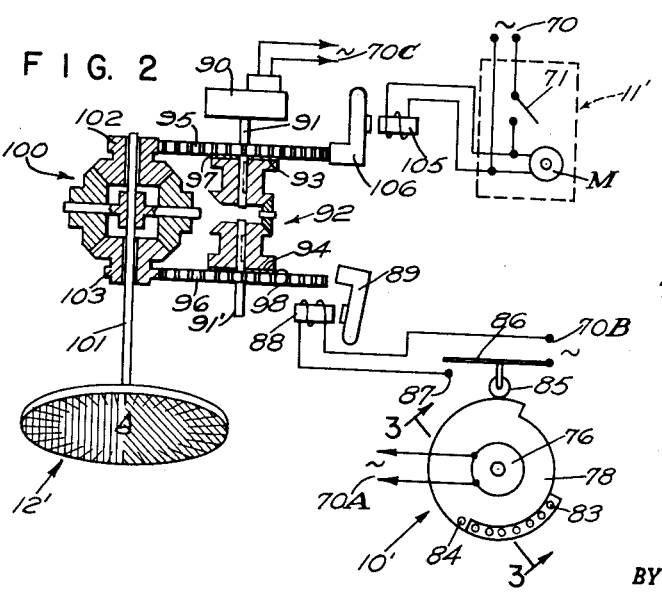
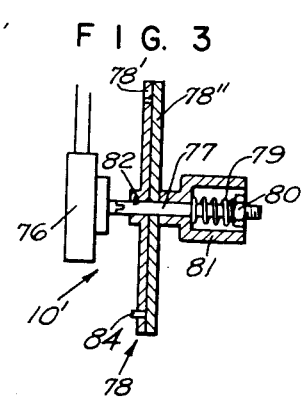
INVENTOR.
CHARLES C. BELL
BY Barlow & Barlow
ATTORNEYS

United States Patent Office 3,003,687
Patented Oct. 10, 1961

3,003,687
TIME INTEGRATING SYSTEM
Charles C. Bell, 180 Wampanoag Road,
East Greenwich, R.I.
Filed Jan. 15, 1958, Ser. No. 709,076
4 Claims. (Cl. 235—61)

This invention relates to a time integrating system which will continuously indicate the algebraic difference between two time inputs.

In a factory where a production machine is operating or a process is in operation, it is necessary that one know exactly how many pieces are being produced by the machine or how many manufactured units are being produced by a process in relation to a planned schedule. Production control methods today usually consist of counting the number of pieces a machine produces and making a record of this production on a shift-to-shift basis, that is, over a given working time interval. The recorded number of pieces may then be related to an hour or minute basis by dividing the number of pieces produced by 8 hours or 480 minutes if the shift happens to be of 8-hour duration. It is usual, therefore, that the production information of a machine is not available until after the shift has completed its work, and also, unless the information is plotted graphically, the supervisory control has no way of knowing whether a machine is falling behind in its scheduled production or not. Therefore, if such a visual representation is desired, an additional plotting operation is necessary in order to compare actual production against the scheduled production. Using a production control of this nature, it may very well happen that supervisory control personnel will be unaware that production from a machine is slowing down until appreciable time has elapsed. Accordingly, it is desirable that there be some method which will instantaneously indicate the production efficiency of a machine or process.

Utilizing the knowledge gained from past experience with a particular machine or process, one is able to estimate quite closely what production should be expected during a given period of time. From a practical operating standpoint, this estimate is arrived at by deducting non-productive time from total time, and multiplying this resultant time by the theoretical 100% rate of production. It may be seen, therefore, that the planned production is scheduled on the basis of a "practical" percentage which is less than 100% by the percentage of expected "down time."

This invention consists of apparatus that makes possible a continuous comparison of machine or process running time with that time that has been estimated for a given amount of production. By utilizing an adjustable mechanism, a reference time basis is established within the apparatus in terms of a certain percentage of a selected time unit. The total integrated time accumulated by this mechanism, which is pre-set according to estimated production efficiency, is continuously compared with the total actual integrated running time of the machine or process, and in this manner the instrument is made to show whether or not the machine or process is ahead of or behind the planned schedule.

It is accordingly an object of this invention to produce a time integrating device which will, when properly coupled to a machine or process, indicate directly whether or not the machine or process is on schedule.

A more specific object is to produce a time integrating device having a variable reference time base mechanism and to compare the accumulated time of this reference with the accumulated time of a second time device which is responsive to the output of the machine or process.

A still further object of the invention is to provide a time integrating device for monitoring a production machine or process which will indicate visually not only whether the machine or process is behind or ahead of schedule but also the amount of deviation thereof.

With these and other objects in view the invention consists of certain novel features of construction as will be more fully described and particularly pointed out in the appended claims.

In the accompanying drawings:

FIGURE 1 is a schematic diagram indicating one mode of producing a suitable apparatus;

FIGURE 2 is a diagrammatic view of a second form of suitable apparatus; and

FIGURE 3 is a sectional view taken substantially on line 3—3 of FIGURE 2 showing a possible manner in which an adjustable cam may be made.

In proceeding with this invention and purely by way of example, I produce a reference time base by a mechanism generally indicated 10 in the drawings and compare this reference time, through a suitable mechanism, with a machine signal input produced as at 11. By comparing the reference time with this signal input and by utilizing a suitable apparatus, two embodiments of which will be more specifically described, I may obtain an algebraic difference between the time base and the time input, which may be read directly on a dial such as indicated at 12.

Referring now more specifically to FIGURE 1 of the drawings, I have shown therein a suitable source of alternating current which is provided at terminals 14. This alternating current may be of any frequency, the commercial available frequency in the United States being 60 cycles. Therefore, the various A.C. operations which are carried on are designed to operate at this frequency. However, it should be understood that other frequencies may be utilized.

The reference time device in the first embodiment consists of a synchronous motor 16 which is electrically connected through a master switch 15 to the A.C. input 14. By a suitable choice of motor and gearing, the output shaft 17 of this motor may be made to rotate at one revolution per minute. This output shaft has directly attached thereto a cam 18. This cam 18 is a split-faced cam consisting of two plates in face-to-face engagement, one of which may be rotated relative to the other. By shaping each of these plates with a substantial cut out portion, such as at 19, and providing a pin locking device such as 20 between these plates, it will be obvious that the cam opening may be varied as desired.

The pin holes are perfectly spaced so that each represents one percent of a revolution, thereby making possible a reference time circuit actuation consisting of any desired percentage of the total time of revolution of cam 18. The pin 20 is then set to engage the particular hole that will represent the desired overall efficiency planned for the monitored machine. Accordingly, a repetitive cycle or time interval is established for use as a reference base for integration of the total time of operation as planned in the production schedule.

A cam follower such as 21, which is associated with cam 18, is mounted so as to actuate the pole 22P of a single pole double-throw switch 22 between the contacts 23 and 24. The input from the monitored machine which is indicated generally at 11 is produced by a single pole, double throw switch 25 which has the pole 25P thereof operating between contacts 26 and 27. The switch 25 is normally engaged with contact 26, which indicates that the machine is not producing and when the machine begins to produce, suitable means as indicated at 29 by a dashed line from the machine M will actuate the switch 25 so that the switch pole 25P is moved against contact 27.

The integrating device of this invention may take various forms. In FIGURE 1 it is disclosed as including two synchronous motors 30 and 31 which have affixed to the output shafts thereof gears 32 and 33 respectively. The gears 32 and 33 are in constant mesh relationship with a main gear 34 which is mounted on a shaft 35. Shaft 35 in turn is coupled to a speed reducer 36, which has an output shaft 37, the end of which is attached to a plate 38 of a friction clutch generally designated 39. The speed reducer is designed to produce the correct units on indicator dial 12 and thus if there are 20 divisions on the dial each indicating one hour and the input thereto is one revolution per minute, the ratio should be 600 to 1. The output of the friction clutch 39 is shown as a spur gear 40 which is mounted for rotation on a shaft 41 which has affixed at the free end thereof a pointer 42 and intermediate thereof a cam 43. Cam 43 has associated therewith a cam follower 44 that is mechanically coupled to a single-pole double-throw switch 45. A dial plate 46, which may be colored in red and green, as shown by the shading, is mounted in association with the pointer 42 and in order to reset the pointer 42 to the midpoint of the dial, a knob 47 is provided which is coupled through gears 48 and 49 to gear 40 which will then turn the shaft 41 independently of shaft 37.

In order to understand how the various units are interrelated, the wiring diagram will now be described. It will be noted that from the source of current 14, the lead, which passes from switch 15 and which bears reference numeral 50, is in fact a common lead that extends first to motor 16 over wire 51, to motors 30 and 31 over wire 52, to indicate lamp A over lead 53, and to the pole of switch 45 over lead 54. The other side of the source 14, as represented by lead 55, connects first to the other side of motor 16 by lead 56 and thence to contacts 24 and 26, of switches 22 and 25 respectively, over lead 57 and finally to a common connection between indicator lamps B and C over lead 58. It will be noted that the poles 22P and 25P of switches 22 and 25, respectively, are connected together via a lead 59 and that contact 23 of switch 22 leads to the other side of motor 30 over lead 60 while the contact 27 of switch 25 leads to the other terminal of motor 31 over lead 61. Also, it will be noted that the indicator light A is connected to the lead 60 by a lead 60A and that a circuit is completed between contacts 45B and the other terminal of indicator lamp B, and between terminal 45C and the other side of indicator lamp C.

To appreciate the operation of the device, let us assume that the machine M is in fact a textile loom, or similar device, and that the switch 25 is mechanically inter-related to an actuating device which initiates operation of the machine that will then produce or operate upon material and change the form thereof. To this end, switch 25 is normally biased in the position shown in the drawing, so that the pole 25P thereof will be in electrical contact with the contact 26. Thus, with power applied to the apparatus through the closing of master switch 15, a circuit will be established from both sides of the power source 14 to motor 30, which may be easily traced by disregarding the common lead 50 from the power source and noting that the other side of the source is completed through the leads 57, 59 and 60. Thus, with the machine M not in production, motor 30 will be activated which will rotate gear 32 and in turn gear 34 to turn the pointer 42 in a counter-clockwise direction. This will cause pointer 42 to turn into the area of the dial that is shaded for red and visually indicate that the machine is behind its schedule. Assuming that the machine does not produce for a reasonable length of time, this condition of activity of motor 30 will continue unless switch 22 changes its position. Motor 30 might be termed the reference time input of the integrating apparatus and is activated by the mechanism enclosed in the broken lines and designated 10 which generates a reference time base that is related to a preset percentage efficiency of the machine M, and, as described previously, consists of a synchronous motor 16 which has a one revolution per minute output or some other standard as to be consistent with the unit output on the dial 42, which is calibrated, for example, in time units of one minute. Therefore, as the cam 18 rotates, the cam follower 21 will eventually enter the cut-away cam portion 19 and when this occurs the switch 22 will change its position so that the pole 22P will now engage contact 24. Movement of the pole 22P to this position breaks the circuit to line 60 and simultaneously brings leads 57 and 59 to the same polarity. Therefore, rotation of motor 30 will cease and accordingly the rotation of pointer 42 will also cease for a predetermined time interval representing the estimated inefficiency of the machine M to be subtracted from theoretical 100% production. In the proposition thus far advanced, it is assumed that the pointer 42 has rotated counter clockwise and therefore the cam follower 44 riding on cam 43 has entered the depressed portion of cam 43 thereby changing the position of switch 45 so that a circuit is now completed to indicator lamp B, thus visually indicating by another means that the machine in question is behind schedule.

Assume now that the machine which is being monitored has completed its outage and commences production. When this occurs, and following the previous assumption, the actuating device which initiates operation and production of the machine has been depressed and the switch 25 changes position, the pole 25P thereof making contact with contact 27. Now, if switch 22 is in the position previously described, that is, the follower 21 is in depression 19 of the cam so that the pole 22P is in contact with contact 24, a circuit will be completed from the side 55 of the power source 14 through leads 57, 59 and 61 to one terminal of motor 31, the other terminal being connected from lead 50, which will now cause rotation of the gear 34 and pointer 42 in the clockwise direction. If the machine continues to produce, the circuit established between the pole 25P and contact 27 will be maintained and eventually cam follower 21 will ride on the high arc of cam 18 and pole 22P and will return to contact with contact 23, in which position of switches 22 and 25 the circuit to both motors 30 and 31 is broken, so that neither will operate. This condition demonstrates the fact that when a machine is producing as expected no gain or loss is being registered in what might be termed production efficiency of the machine as set into this integrating device through the apparatus in the block labeled 10. It will be apparent from the above discussion that the motor 30 runs to indicate lost time only when the machine being monitored is not producing. Accordingly, this information can be utilized by placing an amber panel light A, in parallel with the motor 30, which can then indicate visually, at a suitable location, the fact that the machine is not producing. It will also be convenient in certain instances to utilize other indicator lights and to this end we have shown lights B and C which are respectively red and green. The red light B will be actuated when the cam 43 has traveled a sufficient distance counter-clockwise so that the cam follower 44 will fall into the depression therein. The cam 43 is so oriented on the shaft 41, with respect to pointer 42, that this will occur as pointer 42 departs from zero in the counter-clockwise direction. Conversely, the green light C will be lit during the 180° clockwise travel of the pointer 42 from the zero deviation position, and in this case the cam folower 44 will be riding upon the high semi-circular portion of the cam 43.

Referring now to FIGURE 2 of the drawings, there is shown a modified form of the invention which utilizes the same principle as in the previous embodiment but produces the desired result through different apparatus. In this instance, there is shown diagrammatically in the broken line box 11' a controlled machine M which is powered from a suitable source of alternating current as at 70 and which has in the circuit between the source of alternating current 70 and the monitored machine a switch 71 that is representative of means for turning the machine on to produce material. It will, of course, be understood in practice that not always will a switch in the power source to the machine be an indication of production and therefore the diagrammatic showing of the switch 71 is purely exemplary of some means which is adequate to indicate true production.

Also, included in the embodiment of FIGURE 2 is a unit which may be termed a reference time unit and which is generally designated 10'. This unit is utilized to produce an input to the apparatus which is representative of the predetermined efficiency of the machine in question and to that end is quite similar to the unit 10 of FIGURE 1. The unit 10' also includes a synchronous motor 76 which is powered from a source of alternating current 70A and which has an output shaft 77 (see FIGURE 3) that is coupled to a split cam 78 rotating, for example, at one revolution per minute. The split cam 78 basically consists of two generally circular plates which are in face-to-face engagement, this engagement being maintained by a spring 79 having one end thereof fixed to shaft 77 as by a nut 80 and the other end thereof bearing against a cup follower 81. One plate 78' of cam 78 is keyed to shaft 77 as at 82 while the other plate 78" is free to rotate about shaft 77 and is maintained in tight angular engagement with plate 78' through the urgence of the spring 79 and its associated parts. Both plates 78' and 78" are formed preferably with arcuate cut out sections that extend for approximately 180° of arc. Thus, if one of the plates is provided with a plurality of holes, such as shown at 83, and a pin such as 84 is provided in the other plate, it will be apparent that by separating and angularly positioning the plate 78" relative to plate 78', and by placing the pin 84 in a selected hole 83, that a fixed poistion of angular adjustment between the plates may be obtained.

Associated with the cam 78 is a cam follower 85 which is coupled to the pole 86 of a single pole switch having a contact 87. It will be apparent that if the switch pole 86 is placed in series with one leg of a source of alternating current such as 70B, an electrical unit may be controlled and in the present instance this electrical unit is shown as a magnet 88. Thus, the position of the cam follower 85 controls the activation or deactivation of magnet 88, the magnet in the present instance controlling a pivoting armature dog, the action of which will be presently described.

The time integrating unit consists of a synchronous timing motor 90 that is powered from a suitable source of alternating current such as 70C and which has an output shaft 91 that rotates at a speed consistent with the gear ratios between it and dial 12' so that the divisions on the dial are correct. A driving member 92 is directly connected to this shaft 91 and has a reversing gear train associated therewith so that the two opposed faces 93 and 94 thereof rotate in opposite directions. Freely mounted on shaft 91 adjacent to the face 93 is a gear member 95 and similarly freely mounted on the shaft 91' adjacent to the face 94 is another gear 96. Each of these gears 95 and 96 are resiliently held towards the faces 93 and 94 respectively by means not shown in this purely diagrammatic view. This means may take the form of a spring or other resilient device, and mounted between the faces 93 and 94 and their respective gears 95 and 96 are friction surfaces 97 and 98 which will allow gears 95 and 96 to turn either with, or remain stationary with respect to, driving member 92 depending upon whether some means engages the gears to prevent their rotation. The output of the time integrating unit is taken from gears 95 and 96 by a mechanical differential gear generally designated 100 having an output shaft 101 and two input gears 102 and 103, respectively; gear 95 meshing with input gear 102 while gear 96 meshes with gear input 103. Since the operation of differential mechanisms is well known in the art, a detailed discussion will not be had here except to say that it will be apparent to those skilled in the art that if gears 95 and 96 are rotating at the same speed and different directions, there will be no output on shaft 101. However, if the relative speed between the two gears changes, an output may be had on shaft 101, which output will be proportional to the difference in speed in the gears 95 and 96 and selective as to direction depending upon which gear is running faster than the other. Accordingly if an indicating means is associated with shaft 101 such as shown at 12', one may have a visual representation of this difference in speeds of gears 95 and 96 to produce this relative rotation. A pivoting dog 89 which is under the influence of magnet 88 already described in connection with the reference time source is provided for engaging gear 96 and thereby stopping its rotation relative to hub 92. Similarly a magnet 105 having a pivoting dog 106 for engagement with gear 95 is provided. Magnet 105 is electrically connected in parallel with the power source to motor M and thus the posiiton of dog 106, which will stop the rotation gear 95 or allow gear 95 to rotate, may be controlled as a function of machine production. In order to fully appreciate how these parts just described are inter-related and produce the desired result, a typical operation of this embodiment disclosed in FIGURE 2 will now be described.

Let us assume that the machine M is producing a material in which case the exemplary switch 71 will be closed thereby energizing the magnet 105 which will withdraw the dog 106 from engagement with gear 95. Also motor 90 is energized and will rotate hub 92 and tend to rotate gears 95 and 96 through friction clutches 97 and 98. Additionally, motor 76 is energized, turning cam 78 at a speed of one revolution per minute, for example, and we shall assume that the cam 78 is rotating clockwise as viewed in the drawing with switch 86 in the position also as shown, which will mean that dog 89 is out of engagement with gear 96. With the mechanism in the state above described, it will be apparent that both gears 95 and 96 will rotate at the same speed thereby producing a zero output on shaft 101. However, if for some reason the machine M stops producing and switch 71 opens, dog 106 will engage gear 95 and the differential 100 will have an input thereto only at gear 103, which for purposes of this discussion will produce a counter-clockwise rotation of the shaft 101. With this particular set of conditions, it will be apparent that an output from the differential indicates that the machine is loosing production at a certain rate.

Let us further assume that the cam 78 has now rotated sufficiently clockwise so that the follower 85 enters the depression therein to energize magnet 88 and thereby engaging dog 89 with gear 96. This set of conditions will produce a zero output from the differential 100 and effectively the cumulative differential output is being corrected for the precalculated efficiency of the machine M. During this period it is also possible that the machine M might again begin producing, and in that case, dog 106 would be disengaged from gear 95 and a clockwise output of shaft 101 would be secured. It will thus be apparent, that based upon any given efficiency of the machine, the dial 12 will indicate whether the machine is ahead of the calculated efficiency or behind. For instance, if over a period of time the machine is actually 80% efficient and the instrument reference time base generator is pre-set to be 80% efficient, the dial 12' will indicate no loss inasmuch as gear 95 will in effect be rotating 80% of the time, and gear 96 will be stopped for 80% of the time.

From the above it will be apparent that I have disclosed an integrating apparatus with time totalizing register which may be utilized for continual supervisory control of any machine, and it will be further apparent that certain elements of the apparatus may be separated one from the other as is generally diagramed by the broken lines of FIGURE 1. For instance, a single efficiency input or reference time base may be utilized for a plurality of integrating apparatus and to that end one unit 10 may be connected in parallel with integrators associated with individual machines. Furthermore, the totalizing integrators may be grouped remotely from the individual machines they monitor.

I claim:

1. A time integrating system for monitoring machine activity comprising a first device, said first device producing a continuous output signal for a pre-selected percentage of a selected time unit, a second device, said second device producing a continuous output signal upon actuation from a monitored machine, and a time totalizing storage register coupled to said devices, said register comprising a central shaft having a time indicating device at one end thereof and electric motor means at the other end, said motor means electrically coupled to said devices and mechanically coupled to said shaft, whereby upon a signal from said first device the shaft will rotate in one direction and upon a signal from the second device the shaft will rotate in the other direction thereby accumulating the total algebraic time difference between the total integrated time of actuation of said first and second devices.

2. A control system as in claim 1 wherein a switching means is interposed between said motor means and said devices, said switching means being electrically interconnected so that no signal is fed to said motor means when a signal is present from both devices.

3. A time integrating system for monitoring machine activity comprising a first device, said first device operable for a pre-selected percentage of a selected time unit and generating a continuous electric signal during said time unit, a second device, said second device operable upon an electric input signal from a monitored machine and generating a continuous electric signal, and a time totalizing storage register coupled to said devices, said register comprising a shaft rotatable at a speed specifically related to the time units of said register, a reversing mechanism having two inputs and an output, a visual indicator, the output of said mechanism connected to said visual indicator by said shaft, electric means operable for coupling said shaft selectively to one or the other of said reversing mechanism inputs in response to signals from said devices, thereby accumulating the total algebraic time difference between the total integrated time of actuation of said first and second devices.

4. A time-integrating system for monitoring machine activity comprising a reference time base mechanism, said mechanism driven by a synchronous motor and producing a continuous electric output signal of a positive character for a preset period of a standard selected time base unit, an electric signal producing means adapted to be operated in accordance with the productive activity of a monitored machine and emitting a continuous electric signal during its activity period of a negative character, means associated with said signal-producing apparatus whereby only one signal is selected at a time, a time-totalizing storage register coupled to said selecting means, said coupling including a reversely operable electric motor means, the rotative direction of said motor means being responsive to a positive or negative character input said register having an indicator connected to the output thereof, said indicator having a scale calibrated in time units corresponding to the preselected time base whereby the total algebraic time difference of said time base mechanism and said electric signal-producing means will be shown on said indicator.

References Cited in the file of this patent

UNITED STATES PATENTS

| | | |
|---|---|---|
| 1,131,104 | Avram | Mar. 9, 1915 |
| 2,044,825 | Woytych | June 23, 1936 |
| 2,283,993 | Holtz et al. | May 26, 1942 |
| 2,437,048 | Salles | Mar. 2, 1948 |
| 2,730,300 | Savino | Jan. 10, 1956 |

OTHER REFERENCES

Von Valkenburgh, Nooger and Neville: "Basic Synchros and Servomechanisms, vol. 1, pp. 1–4 to 1–7, John F. Rider Publisher Inc. (August 1955).